United States Patent [19]

Dai et al.

[11] Patent Number: 5,534,135

[45] Date of Patent: *Jul. 9, 1996

[54] SYNTHESIS OF ZEOLITES

[75] Inventors: Pei-Shing E. Dai; David E. Sherwood, Jr.; Burton H. Bartley, all of Port Arthur, Tex.

[73] Assignee: ABB Lummus Global Inc., Bloomfield, N.J.

[*] Notice: The term of this patent shall not extend beyond the expiration date of Pat. No. 5,354,452.

[21] Appl. No.: 206,803

[22] Filed: Mar. 7, 1994

[51] Int. Cl.$^6$ ............................ C10G 11/05; C10G 45/00; B01J 29/08

[52] U.S. Cl. ...................... 208/120; 208/108; 208/111; 208/113; 208/135; 208/138; 208/216 R; 208/217; 208/251 H; 208/254 H; 502/79; 502/85

[58] Field of Search ...................... 502/79, 85; 208/108, 208/111, 113, 120, 135, 138, 216 R, 217, 251 H, 254 H

[56] References Cited

U.S. PATENT DOCUMENTS

| | | | |
|---|---|---|---|
| 4,857,170 | 8/1989 | Hoek et al. | 502/79 |
| 4,869,803 | 9/1989 | Ward | 208/111 |
| 4,879,019 | 11/1989 | Ward | 208/111 |
| 4,894,142 | 1/1990 | Steigleder | 208/111 |
| 4,960,505 | 10/1990 | Minderhoud et al. | 208/111 |
| 5,013,700 | 5/1991 | Falth | 502/79 |
| 5,059,567 | 10/1991 | Linsten et al. | 502/79 |
| 5,069,890 | 12/1991 | Dai et al. | 502/79 |
| 5,112,473 | 5/1992 | Dai et al. | 208/120 |
| 5,139,984 | 8/1992 | Iwamoto et al. | 502/79 |
| 5,143,878 | 9/1992 | Dai et al. | 502/79 |
| 5,207,892 | 5/1993 | Vassilakis et al. | 208/111 |
| 5,242,677 | 9/1993 | Cooper et al. | 502/85 |
| 5,308,472 | 5/1994 | Dai et al. | 208/111 |
| 5,338,437 | 8/1994 | Iwamoto et al. | 208/110 |
| 5,354,452 | 10/1994 | Dai et al. | 208/111 |

FOREIGN PATENT DOCUMENTS 0421422  4/1991  European Pat. Off. .............. 502/79

Primary Examiner—E. Rollins Cross
Assistant Examiner—Walter D. Griffin
Attorney, Agent, or Firm—Chilton, Alix & Van Kirk

[57] ABSTRACT

A novel zeolite characterized by a large number of secondary pores, a substantially decreased Lattice Constant of below about 24.19 Å, and a substantially decreased Acid Site Density is attained by hydrothermal and acid-treating of an ultrastable Y-zeolite.

15 Claims, 1 Drawing Sheet

SYNTHESIS OF ZEOLITES

RELATED APPLICATIONS

This application is related to allowed application Ser. No. 07/962,549, filed Oct. 19, 1992, now U.S. Pat. No. 5,354,452, which is a continuation-in-part of application Ser. No. 07/463,650, filed Jan. 11, 1990, now abandoned.

FIELD OF THE INVENTION

This invention relates to a process for treating a zeolite to modify its properties. More particularly, this invention relates to a method of obtaining zeolites having a Unit Cell Size which is smaller than previously known in the art and to the ultra low cell size zeolite obtained therefrom.

BACKGROUND OF THE INVENTION

As is well known to those skilled in the art, zeolite catalysts have been used in hydrocarbon processing. Prior art zeolites have been found to be effective as catalysts for cracking, hydrocracking, hydroisomerization, etc. Recent trends in resid hydroprocessing demand increased conversion of feed having a boiling point above 1000° F. as well as improved hydrogenation selectivity as measured by Conradson carbon conversion and hydrodenitrogenation (HDN) of the 1000° F.-products attained from cracking of the residue.

The FCC octane barrel catalyst (i.e. a catalyst which permits attainment of both octane number and gasoline yield) typically contains ultrastable Y-zeolites or dealuminated Y-zeolites. The ultrastable Y-zeolite is generally obtained by hydrothermal or thermal treatment of the ammonium or hydrogen form of the Y-type zeolite at temperatures above 1000° F. in the presence of steam. Ultrastabilization by hydrothermal treatment was first described by Maher and McDaniel in the U.S. Pat. No. 3,374,056. U.S. Pat. No. 3,449,070 to McDaniel et al. discloses a method of producing an ultra-stable Y-zeolite by base exchanging a charge faujasite zeolite to reduce the alkali metal content. The Unit Cell Size of the product is 24.40 Å–24.55 Å. Ammonium exchange and a second hydrothermal treatment at a temperature of about 1300° F. to 1900° F. further reduces the Unit Cell Size down to 24.20 Å to 24.45 Å. Hydrothermal treatment removes tetrahedral aluminum from the framework but not from the zeolite cages or channels where it remains as a hydrated cation or an amorphous oxide.

The Silica to Alumina Ratio of fluid catalytic cracking (FCC) catalyst usually refers to the $SiO_2/Al_2O_3$ mole ratio of the zeolite component. It differs from the atomic Si/Al ratio by a factor of two. Framework silica/alumina and total silica/alumina mole ratios of the zeolite should also be distinguished. Only aluminum (or alumina) that is part of the zeolite crystal structure (the framework) is included in the former. Total or bulk silica/alumina mole ratio also includes the alumina or amorphous oxide debris left in the void spaces of the zeolite after dealumination.

A variety of methods of dealumination are known in the art. A reference which provides an informative overview of the various processes is *CATALYTIC MATERIALS:RELATIONSHIP BETWEEN STRUCTURE AND REACTIVITY*, Ed. White, T. E., et al., Chapter 10, American Chemical Society, Washington, D.C., 1984. Using a chelating agent such as EDTA, up to about 50% of aluminum can be removed from the zeolite in the form of a water soluble chelate, without any appreciable loss in zeolite crystallinity and about 80% of aluminum atoms can be removed from the zeolite in the form of a water soluble chelate while the zeolite maintains 60%–70% of its crystallinity. U.S. Pat. No. 4,503,023 teaches the procedure for treating zeolites with ammonium hexafluorosilicate. In this method, an aqueous solution of $(NH_4)_2SiF_6$ is used to replace some aluminum atoms with silicon atoms in the zeolites. Silicon may replace up to 60% of the aluminum without crystal damage. Debris formation and structure defect are negligible in this process. Unit Cell Sizes range from 24.35 Å to 24.60 Å.

In general, as the zeolite framework is dealuminated, the Unit Cell Size ($A_0$) decreases. The number of aluminum atoms per unit cell ($N_{A1}$) can be estimated from the Unit Cell Size according to the Breck-Flanigan relationship:

$$A_o \text{ (in Å)} = 24.191 + 0.00868 (N_{A1}) \quad [1]$$

Because the total number of aluminum and silicon atoms ($N_{A1} + N_{Si}$) is constant, according to:

$$N_{A1} + N_{Si} = 192 \quad [2]$$

then, the framework Silica to Alumina mole ratio can be expressed as:

$$SiO_2/Al_2O_3 = 2[(1.667/UCS - 24.19) - 1)] \quad [3]$$

where UCS is the Unit Cell Size in Angstroms equivalent to $A_0$ (in Angstroms) of Equation 1.

X-ray diffraction Unit Cell Size measurements can therefore be used to estimate the framework Silica to Alumina Mole Ratios. The Unit Cell Size of the zeolite may also predict zeolite properties such as hydrothermal stability, total acidity, and acid strength.

The catalytic activity in a fluid catalyst cracking process and the octane number of the product gasoline also correlate with the Unit Cell Size of the zeolite catalyst component. Ritter et al. reported in NPRA Annual Meeting, Los Angeles; Mar. 23, 1986; paper AM-86-45, that in FCC pilot plant experiments, the Unit Cell Size correlated well with both the research octane number and motor octane number of product gasoline fractions. They reported that about 15% of the total octane gain is observed as the Unit Cell Size decreased from 24.45 Å to 24.35 Å, and an additional 35% of the octane gain occurred as the Unit Cell Size decreased from 24.34 Å to 24.28 Å.

As is well known to those skilled in the art, FCC gasoline octane barrels can be improved if the Unit Cell Size equilibrates to approximately 24.30 Å. Reducing the Unit Cell Size below 24.30 Å increases gas yield but does not significantly improve octane. There is a continuing search for a narrow band of Unit Cell Sizes that will yield maximum octane barrels. In most of the prior art methods of dealuminating catalysts for cracking and hydrocracking processes, the Unit Cell Size is controlled to be in the range of 24.30 Å–24.45 Å in an attempt to achieve maximum activity for vacuum gas oil conversion in FCC operations.

Mass transfer within cracking and hydrocracking catalysts for heavy oil upgrading has a significant effect on gasoline and light gas oil selectivities. The cracking sites on or near the zeolite crystal exterior primarily crack feed molecules such as gas oils, vacuum gas oils and residual. The cracking sites in the zeolite crystal interior primarily crack smaller product molecules like gasoline. Improving access to the zeolite interior reduces gasoline recracking and enhances gasoline production. The most straightforward way to minimize diffusional limitation is to increase the secondary porosity of the zeolites and by reducing the zeolite crystal size via dealumination.

U.S. Pat. No. 3,506,400 to Eberly, Jr., et al., discloses treating a conventional faujasite having a silica/alumina mole ratio of 8–12 in the ammonia form with steam at 800° F.–1500° F. followed by acid treatment at temperatures and times effective to remove amorphous alumina. This reference discloses product zeolites with Unit Cell Sizes greater than or equal to 24.28 Angstroms with alumina present and about 24.2 Angstroms for an alumina free crystalline polysilicate. This reference fails to disclose any product zeolite having a Unit Cell Size less than 24.19 Å. This reference also does not teach how to increase the secondary pore volume of the zeolites in order to augment the cracking activity of heavy oils.

U.S. Pat. No. 4,840,930 to LaPierre et al. discloses treating a charge Y-zeolite to make it stable to acid. The charge is characterized by a silica/alumina ratio of 3–25. The charge is contacted with a steam-containing atmosphere at increasing temperatures in the 392° F.–1202° F. range. Specifically the critical rates of heating are (i) >2° and <4° C./min at 392° F.–932° F., and (ii) 0.2°–0.5° C./min at 932° F.–1202° F. These ranges are critical; and operating outside these ranges yields undesirable results. This reference does not teach a method of producing zeolite having a Unit Cell Size of 24.19 Å or less or having an increased secondary porosity.

U.S. Pat. No. 4,512,961 discloses a process of producing a dealuminated Y-zeolite by a combination of hydrothermal treatment at a temperature from 932° F. to 1652° F. for a period of 1–5 hours and ion-exchange resin removal of aluminum from the crystalline structure of the zeolites at 212° F. for a time of about 1–4 hours. This patent does not reveal any product zeolite having a Unit Cell Size of 24.19 Å or less.

U.S. Pat. No. 5,059,567 to Linsten et al., discloses a process for the preparation of a modified Y-zeolite having a Unit Cell Size of 24.15–24.59 Å. The product zeolite is produced by subjecting charge zeolite NaY to a series of treatment steps comprising ammonium ion exchange and calcination. If the Unit Cell Size is to be reduced to 24.15–24.35 Å, an aluminum ion-exchange is carried out, followed by calcination in steam at 500°–900° C. The decrease in the Unit Cell Size depends on the amount of aluminum supplied by ion-exchange. U.S. Pat. No. 5,242,677 to Cooper et al., discloses a method of preparing stable Y-zeolite with Unit Cell Sizes of 24.09–24.14 Å by the steps of aluminum ion-exchange, steam calcination, and acid treatment. The instant invention can be distinguished from these two references in that no aluminum ion-exchange step is required to produce a dealuminated Y-zeolite having Unit Cell Sizes of 24.02–24.18 Å.

U.S. Pat. No. 5,243,121 to Madon et al., discloses an FCC catalyst comprising a non-zeolitic component of at least 45% $Al_2O_3$ and containing no more than 30% Y-zeolite with Unit Cell Sizes less than 24.29 Å. As shown in Example 1 of Madon et al's patent, the hydrothermally treated Y-zeolites having Unit Cell Sizes of 24.26 and 24.27 Å gave greater yields of isobutylene than the zeolite having the Unit Cell Size of 24.29 Å and a steamed commercial Y-zeolite having the Unit Cell Size of 24.23 Å.

We have now found that a dealuminated Y-zeolite having a Unit Cell Size smaller than about 24.19 Å and increased secondary porosity can be reproducibly made by using the process of the instant invention. The resulting product zeolite is also characterized by presence of a significant quantity of non-zeolite components, i.e., amorphous silica-alumina oligomers. The product zeolite is useful in the conversion of heavy oils containing vacuum resids to lighter products, particularly light gas oil. The product zeolite is also useful in the FCC process for increased C3–C5 olefin yields and reduced slurry oil yields as well as reduced cokemake. The product zeolite can be used as a catalyst for the conversion of propylene to isobutylene and isoamylene as well as for the conversion of paraffins to aromatics in the reforming process.

It is an object of this invention to provide a process for treating a Y-zeolite to yield a novel treated zeolite which is characterized by having a Unit Cell Size smaller than about 24.19 Å. Other objects will be apparent to those skilled in the art.

SUMMARY OF THE INVENTION

In accordance with certain of its aspects, this invention is directed to a process of treating a charge Y-zeolite having a framework Silica to Alumina Ratio of about 5–10:1 and a Lattice Constant of 24.45 Å–24.60 Å said charge being characterized by (i) a Secondary Pore Volume less than about 0.05 cc/g, (ii) a Surface Silicon to Aluminum Ratio as determined by X-ray Photoelectron Spectroscopy of about 1–3:1 and (iii) an Acid Site Density of about 7–32 cc $NH_3$ STP/g zeolite which comprises     contacting said charge zeolite with steam at about 1000° F.–1200° F.;

maintaining said charge zeolite in said contact with steam for about 0.5–5 hours during which time said charge zeolite is converted into a hydrothermally-treated zeolite characterized by (i) a Secondary Pore Volume of about 0.09–0.13 cc/g, (ii) a framework Silica to Alumina Ratio of about 10–36, (iii) a decreased Lattice Constant of about 24.28 Å–24.47 Å, (iv) a surface silicon to Aluminum Ratio of about 1–1.5:1, and (v) an Acid Site Density of about 5–16 cc $NH_3$ STP/g. zeolite; and     contacting said hydrothermally-treated zeolite in acidic medium of concentration >0.2N at 140° F.–220° F. for 0.5–5 hours thereby converting said hydrothermally treated zeolite into a hydrothermally-treated acidified zeolite characterized by (i) a framework Silica to Alumina Ratio of about 60–80, (ii) an increased Secondary Pore Volume of about 0.11–0.14 cc/g, (iii) a decreased Lattice Constant of below about 24.19 Å, (iv) a Surface Silicon to Aluminum Ratio of about 26–36, and (v) an Acid Site Density of about 1–6 cc $NH_3$ STP/g zeolite; and     recovering said hydrothermally-treated acidified zeolite characterized by (i) a framework Silica to Alumina Ratio of about 60–80, (ii) an increased Secondary Pore Volume of about 0.11–0.14 cc/g, (iii) a decreased Lattice Constant of about 24.02–24.18Å, (iv) a Surface Silicon to Aluminum Ratio of about 26–36, and (v) an Acid Site Density of about 1–6 cc $NH_3$/g zeolite.

DESCRIPTION OF THE INVENTION

Figure 1:
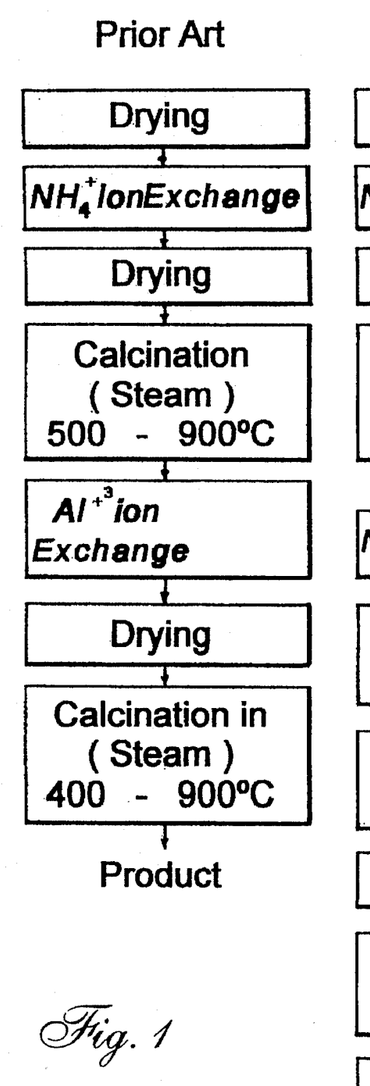
FIG. 1 shows the prior art steps used in making a zeolite.
Figure 2:
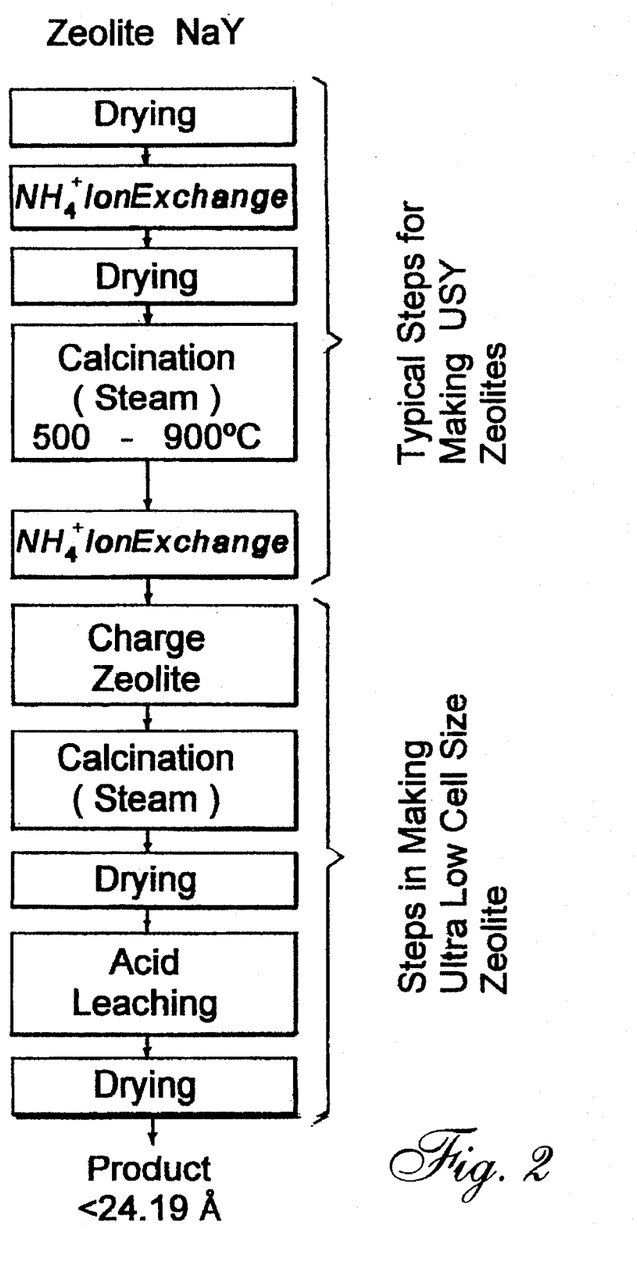
FIG. 2 shows the steps used in preparing the modified zeolite of the invention.

The charge zeolites which may be treated by the process of this invention are typically characterized by various properties including pore size, Unit Cell Size, framework Silicon to Aluminum Ratio, etc.

Primary Pore Size—The primary pores are small pores characterized by a pore diameter of less than about 100 Å, and typically 20 Å–40 Å, say 23 Å. These small or micropores are commonly present together with supermicropores having a pore diameter of 40 Å–100 Å, say 47 Å. Pore size is measured by nitrogen desorption isotherm.

Primary Pore Volume—The volume of the primary pores is typically 0.08–0.14, say 0.09 cc per gram of zeolite. Primary Pore Volume is measured by nitrogen desorption isotherm.

Unit Cell Size—the Unit Cell Size (or Lattice Constant) of the charge zeolites which may be improved by the process of this invention is typically 24.45 Å–24.60 Å, say 24.57 Å. Unit Cell Size is measured using a Scintag PAD-V X-ray diffractometer.

Secondary Pore Size—The secondary pores are large pores characterized by a pore size (diameter) of greater than 100 Å, and typically 100 Å–600 Å. Secondary Pore Size is measured by the nitrogen desorption isotherm.

Secondary Pore Volume—The charge zeolites which may be treated by the process of this invention are characterized by a low Secondary Pore Volume. Typical Secondary Pore Volumes are below about 0.05 cc/g and commonly in the range of 0.02–0.05 cc/g, say 0.02 cc/g. Thus the charge zeolites may be considered as being essentially free of secondary pores. Secondary Pore Volume is measured by the nitrogen desorption isotherm.

Secondary Pore Mode—There is no significant Secondary Pore Mode present in the charge zeolites because the pore volume of secondary pores having diameters of about 100 Å–600 Å typically is essentially zero.

Total Pore Volume—The Total Pore Volume of the charge zeolites which may be treated by the process of this invention may be 0.10–0.12 cc/g, say about 0.11 cc/g as measured by nitrogen desorption isotherm.

Total Surface Area—The Total Surface Area of the charge zeolites which may be treated by the process of this invention may be 600–700 m$^2$/g, say 683 m$^2$/g as measured by Brunauer-Emmett-Teller (BET) Technique.

Crystallinity—the crystallinity of the charge zeolites which may be treated by the process of this invention may be 85%–100%, say 100% as measured by X-ray diffraction.

Framework Silica to Alumina Ratio—The Silica to Alumina Ratio of the charge zeolites which may be treated by the process of this invention may be less than about 10, typically 5–10, say 6. This is equivalent to a Silicon to Aluminum Ratio of 2.5–5, say 3. The framework Silica to Alumina Ratio is calculated according to the following formula wherein UCS is the Unit Cell Size in Angstrom units:

$$SiO_2/Al_2O_3 = 2[(1.667/(UCS-24.19)-1)]$$

Surface Silicon to Aluminum Ratio—The Surface Silicon to Aluminum (Si:Al) Ratio (as measured by X-ray photoelectron spectroscopy) of the charge zeolite which may be treated by the process of this invention may be 1–3, say 2. This is the ratio which prevails over a depth of 50 Å on the surface of the charge zeolite particles.

Zeolite Content—The charge zeolites which may be treated by the process of this invention may be of high zeolite content—typically 85%–100%, say 100% as measured by X-ray diffraction.

Acid Site Density—The Acid Site Density of the charge zeolites which may be treated by the process of this invention may be 7–32, say 28 cc $NH_3$ STP/g as measured by temperature programmed desorption (TPD) of ammonia. This is expressed in units of cc of $NH_3$ at STP conditions per gram of zeolite.

Acid Resistance—The acid resistance of the charge zeolites which may be treated by the process of this invention may typically be 0–30, say 10 (as measured by percent of zeolite crystallinity remaining after contact with a standard acid solution).

The charge zeolites may include ultrastable Y-zeolites and dealuminated Y-zeolites with Silica to Alumina Ratios of 5–10.

It is a feature of this process that it permits attainment of outstanding results when the charge zeolite is an ultrastable Y-type zeolite.

The charge zeolite may be in the hydrogen form, the ammonium form, or in an exchanged form, i.e. a form in which the alkali metal has been exchanged for one or more rare earth metals. The preferred form is an ammonium Y-zeolite.

Illustrative commercially available zeolites which may be treated by the process of this invention may include the following, the properties of which are set forth in the table which follows:

Typical Charge Zeolites

A. The Valfor CP 300-56 brand of ultrastable Y-zeolite (USY) of PQ Corp.

B. The LZ-Y82 brand of Y-zeolite of Union Carbide (an ultrastable Y-zeolite.)

TABLE I

| Property | CHARGE ZEOLITE | |
|---|---|---|
| | A | B |
| Primary Pore Size Å | 23, 47 | 22 |
| Primary Pore Volume cc/gg | 0.08 | 0.08 |
| Unit Cell Size Å | 24.57 | 24.51 |
| Secondary Pore Size Å | none | none |
| Secondary Pore Volume cc/g | 0.02 | 0.02 |
| Total Pore Volume cc/g | 0.11 | 0.11 |
| Total Surface Area m$^2$/g | 683 | 626 |
| Crystallinity % | 100 | 100 |
| Framework $SiO_2$ to $Al_2O_3$ Ratio | 6 | 8.4 |
| Acid Site Density cc $NH_3$/g | 28.9 | 26.2 |
| Surface Silicon to Aluminum Ratio | 2.0 | 1.5 |

The preferred charge zeolite is an ultrastable zeolite such as the Valfor CP300-56 USY brand of ultrastable Y-type zeolite of PQ Corp.

It is a feature of the process of this invention that the charge, preferably an ultrastable Y-type zeolite, is contacted with steam at about 1000° F.–1200° F. say 1000° F. Preferably the steam employed should contain little or no other gases such as carbon dioxide, oxygen, nitrogen, etc. In the preferred embodiment, the steam will be substantially 100% steam, i.e. it contains less than about 10 wt % of non-steam components. It is found that presence of non-steam components in amount greater than about 10 wt % is undesirable because it slows down the reaction.

Although operation at temperature slightly below about 1000° F. (say down to about 800° F.) may be employed, it is found that the desired results are attained to a lesser degree. At temperature of about 600° F. or less, the desired changes may not be attained to any desired degree. Operation at temperature above about 1200° F. undesirably increases the cost of operation; and as the temperature rises above this level, there is increasing chance of forming ultrastable Y-zeolites with the undesirable Unit Cell Size of greater than 24.2 Angstroms. Furthermore it does not appear that it is possible to consistently attain desired low lattice constant above about 1200° F.

The charge zeolite is maintained at the noted steaming temperature for 0.5–8 hours, preferably 1–5, say about 5 hours. Operation below the lower end of the range does not yield desired Lattice Constant of the final product zeolite; and operation above the upper end of the range normally yields zeolites having Lattice Constants greater than 24.19 Å. It is found that the desired degree of improvement (as measured for example by the decrease in the lattice constant) is typically obtained after about 3–5 hours.

At the conclusion of the desired contacting with steam for 0.5–5 hours at temperatures from 1000° F. to 1200° F. the treated zeolite is recovered and cooled to ambient temperature.

The characteristics of the steam treated zeolite may be as follows:

Primary Pore Size—The Primary Pore Size is typically 20 Å–100 Å, say about 47 Å. Thus it may be observed that there is no significant change in Primary Pore Size.

Primary Pore Volume—The Primary Pore Volume is typically 0.07–0.09, say about 0.08 cc/g. Thus it may be observed that there is no significant change in Primary Pore Volume.

Unit Cell Size—The Unit Cell Size (or Lattice Constant) of the treated zeolite is decreased typically to 24.28 Å–24.47 Å, say 24.32 Å–24.42 Å, say 24.39 Å.

Secondary Pore Size—The Secondary Pore Size of the treated zeolite is typically 100 Å– 600 Å and commonly 105 Å–190 Å.

Secondary Pore Volume—The Secondary Pore Volume of the treated zeolite is 0.09–0.13, say 0.10 cc/g. It is unexpected that the Secondary Pore Volume should increase by 300%–650%, say 500% over the Secondary Pore Volume of the charge zeolite.

Total Pore Volume—The Total Pore Volume of the treated zeolite is 0.16–0.20 cc/g, say 0.18 cc/g which is unexpectedly 50%–90%, say 70% greater than the Total Pore Volume of the charge zeolite.

Total Surface Area—The Total Surface Area of the treated zeolite is 500–600 m$^2$/g, say 573 m$^2$/g.

Crystallinity—The crystallinity of the treated zeolite is 75%–95%, say 88% .

Framework Silica to Alumina Ratio—The Silica to Alumina Ratio of the treated zeolite is 10–36, say 16. This corresponds to a Silicon to Aluminum Ratio of 5–18, say 8.

Surface Silicon to Aluminum Ratio—The Surface Silicon to Aluminum Ratio is typically 1.0–1.5, say 1.3:1 which is only 60%–70% of that of the charge zeolite. The Surface Silicon to Aluminum Ratio is measured by X-ray photoelectron spectroscopy. Thus, an Al-enriched surface has been created.

Acid Site Density—This Al-enriched surface is characterized by having a low total number of acid sites. The Acid Site Density of the steam treated zeolite is thereby reduced to 5–16, say 10 cc NH$^3$/g.

Acid Resistance—The acid resistance of the treated zeolite is 45%–65%, say 50%.

It will thus be apparent that the treated zeolite is particularly characterized by (i) an increase in the number of pores in the range of about 100 Å–600 Å and the Secondary Pore Volume, (ii) a decrease in the Unit Cell Size (or Lattice Constant), (iii) a decrease in the crystallinity, and (iv) a decrease in the Surface Silicon to Aluminum Ratio. These treated zeolites are also characterized by (i) a Primary Pore Size and volume which is essentially comparable to that of the charge zeolite, (ii) a decrease in Total Surface Area, (iii) decreased Acid Site Density, and (iv) increased acid resistance.

It is a feature of the process of this invention that the hydrothermally treated Y-zeolite may be contacted in aqueous medium with an acid preferably having a pK$_a$ of less than about 5. It is found that it is possible to prepare product zeolite having a decreased Lattice Constant below about 24.19 Å only if the acid is used in concentration of greater than 0.2N. A lower concentration of acid, e.g., 0.1N or 0.2N hydrochloric acid, when used, will not permit attainment of product zeolites having the desired low Lattice Constant of below about 24.19 Å.

The acids which may be employed may include water-soluble inorganic acids typified by the following; (the pK$_a$ set forth for polybasic acids is that corresponding to the first ionization step):

TABLE II

| Acid | pK$_a$ |
| --- | --- |
| Nitric | <–1 |
| Hydrochloric | <–1 |
| Sulfuric | <–1 |
| o-phosphoric | 2.12 |

Acid gases such as hydrogen chloride, etc., may be employed.

Typical water-soluble organic acids which may be employed may be typified by the following:

TABLE III

| Acid | PK$_a$ |
| --- | --- |
| Citric | 3.08 |
| Acetic | 4.75 |
| Oxalic | 1.23 |
| Propionic | 4.87 |

The preferred inorganic acids include strong mineral acids such as nitric acid or hydrochloric acid. The preferred organic acids include citric acid or dicarboxylic acid such as oxalic, succinic acid. The most preferred acid is nitric acid.

The acids may be employed in aqueous media in concentrations of >0.2N, typically >0.2N to 2.0N, say 0.5N. Treating of the hydrothermally treated zeolites may typically be effected by contacting 100 parts of hydrothermally treated zeolite with 1000–5000 parts, say 2500 parts of 0.5N to 2.0N aqueous acid at 140° F.–220° F. for 0.5–5 hours, say 2 hours.

At the end of the acidification operation, the zeolite particles may be separated from the aqueous acid medium and washed several times with water at ambient temperature. During each washing, the zeolite may contact the wash water for 0.2–2 hours, say 0.5 hours. Each washing may utilize 1000–5000 parts, say 2500 parts of water per 100 parts of zeolite.

The hydrothermally treated and acid treated zeolite may be characterized as follows:

Primary Pore Size—The Primary Pore Size is typically 20 Å–100 Å, say about 47 Å.

Primary Pore Volume—The Primary Pore Volume is typically 0.09–0.12, say about 0.10 cc/g.

Unit Cell Size—The Unit Cell Size (or Lattice Constant) of the treated Y-zeolite is unexpectedly decreased to below about 24.19 Å and typically to 24.02 Å–24.18 Å, say 24.12 Å–24.15 Å. The lowest value previously reported prior to the Linsten et al.'s patent appears to be 24.20 Å. (As reported in Developments in Zeolite Catalysts, Catalytic Studies No. 4887 Z, 1987, page 13). A Unit Cell Size of 24.19 Å is the lower theoretical limit for Y-type zeolites as determined by the Breck and Flanigan equation. The results indicate that the steam treated zeolite with the Unit Cell Size between 24.28 Å–24.47 Å, more preferably 24.32 Å–24.42 Å, say 24.39 Å can be acid treated to give the product of the instant invention, a Y-zeolite having Unit Cell Size of less than 24.19 Å.

Secondary Pore Size—The Secondary Pore Size of the treated zeolite is typically 100 Å–600 Å and commonly 105 Å–190 Å.

Secondary Pore Mode—The Secondary Pore Mode of the treated zeolite is typically 105 Å–190 Å, say 125 Å–135 Å.

Secondary Pore Volume—The Secondary Pore Volume of the treated zeolite is 0.11–0.14, say 0.13 cc/g. It is unexpected that the Secondary Pore Volume should increase by 180%–600%, say 550% over the Secondary Pore Volume of the charge zeolite.

Total Pore Volume—The Total Pore Volume of treated zeolite is 0.16–0.25 cc/g, say 0.23 cc/g which is unexpectedly 50%–150%, say 100% greater than the Total Pore Volume of the charge zeolite.

Total Surface Area—The Total Surface Area of the treated zeolite is 350–800 $m^2$/g, say 721 $m^2$/g.

Framework Silica to Alumina Ratio—The Silica to Alumina Ratio of the treated zeolite is 60–80, say about 77. This corresponds to a Silicon to Aluminum Ratio of 30–40, say 38.5.

Surface Silicon to Aluminum Ratio—The Surface Silicon to Aluminum Ratio is typically 24–36, say 30.

Crystallinity—The crystallinity of the treated zeolite is 40%–65%, say 45% of the charge zeolite. Hence the treated zeolite contains amorphous materials such as alumina, silica-alumina and silica up to 60%.

Acid Site Density—The Acid Site Density of the treated zeolite is 1–6, say 3 cc $NH_3$/g.

Acid Resistance—The acid resistance of the treated zeolite is 80%–100%, say 95%.

It is to be noted that the hydrothermally treated and acid treated zeolite is particularly characterized by:

(i) an unexpectedly large increase in the number of secondary pores as is evidenced by the increase in pore volume. It will be noted that the charge zeolite is characterized by a Secondary Pore Volume of only 0.02–0.05 cc/g and the hydrothermally treated zeolite is characterized by a Secondary Pore Volume of 0.09–0.13 cc/g—while the hydrothermally treated and acid treated zeolite is characterized by a Secondary Pore Volume of 0.11–0.14 cc/g.

(ii) A substantially decreased Lattice Constant. The charge typically has a Lattice Constant of 24.45 Å–24.60 Å, say 24.57 Å and the hydrothermally treated zeolite has a Lattice Constant of typically 24.28 Å–24.47 Å. The hydrothermally treated and acid treated zeolite has a lattice constant of 24.02 Å–24.18 Å, say 24.12 Å which is below the lowest value of 24.20 Å as reported in the Catalytica reference supra.

(iii) A substantial decrease in the Acid Site Density. The charge typically has an Acid Site Density of 5–16 cc $NH_3$/g and the hydrothermally treated zeolite has an Acid Site Density of 5–16 cc $NH_3$/g and the hydrothermally treated and acid treated zeolite has an Acid Site Density of 1–6 cc $NH_3$/g.

It is a feature of the treated zeolites of the invention (typically present in particles of particle size of 0.2–0.4 microns) that they may be mixed with suitable binders, such as silica or alumina to form a mix containing 10–90 w % zeolite. This mix may be extruded, dried at 250° F.–400° F., say 350° F., calcined at 1000° F.–1400° F., say 1200° F. for 0.5–5 hours, say 2 hours, and impregnated with metals which are useful as hydroprocessing catalysts—typically Ni-Mo, Co-Mo, Ni-Mo-P, Co-Mo-P, etc. A typical such catalyst may contain 2.7 wt % Ni and 10 wt % Mo on a 1 mm particle containing 80 wt % alumina and 20 wt % treated zeolite.

This catalyst may be used in a hydrotreating process. Typically in a hydrotreating process (typified by the H-Oil brand of process), reaction is carried out in an ebullated bed reactor containing particulate catalyst. Temperature of operation may be 650° F.–950° F., preferably 750° F.–850° F., say 805° F. at 1000–4000 psig, preferably 2000–3000 psig, say 2500 psig. Space velocity is sufficient to maintain the bed of particulate catalyst in an expanded state. Hydrogen is admitted, with the charge hydrocarbon, in amount of 1000–50,000 SCFB, preferably 5000–10,000 SCFB.

Typical H-Oil feed is an atmospheric reduced crude or a vacuum bottoms; and commonly 95% of the feed boils above 975° F. It typically may contain 1–10 wt % sulfur and up to 100 ppm metals (including nickel and vanadium).

H-Oil product is characterized by lower density and boiling point, lower sulfur content, and lower content of metals.

This zeolite catalyst support may also be loaded with, e.g., platinum-group noble metals such as platinum or palladium and utilized in hydrogenation processes, reforming processes, or wax conversion processes.

It is a feature of the zeolite product of this invention that it may be useful as a catalyst or catalyst component in hydrocarbon cracking as in a fluid catalytic cracking process wherein hydrocarbon charge, such as a gas oil, is cracked at 900° F.–1100° F., typically 960° F. at 0–20 psig, say 0 psig. It is found that the novel zeolite catalyst of this invention may be particularly effective in cracking the 900+F ibp fraction of charge gas oils. The zeolite catalyst gives improved gasoline yields as compared to catalysts having a Unit Cell Size greater than 24.19 Å. As determined by the light cycle gas oil in the cracked product (i.e. % of the oil boiling between 430° F. and 650° F.), the zeolite catalyst of this invention desirably yields crackate having typically 5–10% less of the light cycle gas oil than prior art zeolites. Another important advantage of the zeolite catalyst of this invention is that it yields less than one-half the amount of coke produced by processes using prior art USY zeolites. This is believed to be due to the presence of an increased volume of Secondary Pores (which is typically 0.11–0.14 cc/g, as distinguished from prior art zeolites which are essentially free of Secondary Pores) and an increased Secondary Pore Mode (which is typically 105 Å–190 Å as distinguished from prior art zeolites which do not have a Secondary Pore Mode—because of the absence of Secondary Pores).

DESCRIPTION OF SPECIFIC EMBODIMENTS

Practice of the process of this invention will be apparent to those skilled in the art from inspection of the following wherein all parts are parts by weight unless otherwise stated. An asterisk indicates a control example.

EXAMPLE I

In this example, which represents the best mode presently known of carrying out the process of this invention, the charge zeolite is the Valfor CP-300-56 USY brand of ammonium ultrastable Y-type zeolite of PQ Corp. This Y-zeolite is characterized by the properties set forth in the table infra.

In this example, the charge zeolite (as crystals of particle size of 0.2–0.4 microns) is contacted with essentially 100% steam for 5 hours at 1000° F. This charge zeolite is characterized as in the following table. At the end of the treating period, the hydrothermally treated zeolite is characterized as in the following table. The hydrothermally treated zeolite is cooled to 140° F. and contacted with 0.5N aqueous nitric acid (4 parts of zeolite per 100 parts of aqueous nitric acid) at 140° F. for 2 hours. The aqueous liquid is then removed and the zeolite dried for 24 hours at 250° F.

TABLE IV

| Property | Charge Zeolite | Steam Treated Zeolite | Steam Treated and Acid Treated Zeolite |
|---|---|---|---|
| Primary Pore size Å | 23 | 47 | 47 |
| Primary Pore Volume cc/g | 0.09 | 0.08 | 0.10 |
| Unit Cell Size Å | 24.57 | 24.39 | 24.12 |
| Secondary Pore Volume cc/g | 0.02 | 0.10 | 0.13 |
| Secondary Pore Mode Å | — | 115 | 125 |
| Total Pore Volume cc/g | 0.11 | 0.18 | 0.23 |
| Total Surface Area m$^2$/g | 683 | 573 | 721 |
| Crystallinity % | 100 | 88 | 50 |
| SiO$_2$:Al$_2$O$_3$ Ratio | 6 | 16 | 77 |
| Surface Si:Al Ratio | 2.0 | 1.3 | 30 |
| Zeolite Content | 100 | 82 | 45 |
| Acid Site Density cc NH$_3$/g | 28.9 | 10 | 3 |
| Acid Resistance | 0 | 50 | 95 |

Preparation of catalyst from this treated zeolite may be carried out by mixing 20 parts of zeolite and 80 parts of gamma alumina, extruding to form 1 mm×6 mm cylinders, drying at 350° F. for 4 hours, calcining at 1200° F. for one hour, and then loading with active metals. The particles are impregnated with aqueous nickel nitrate solution, dried at 250° F. for 4 hours, and calcined at 1200° F. for one hour. The particles are then impregnated with aqueous ammonium molybdate solution, dried at 350° F. for 4 hours, and calcined at 1200° F. for one hour.

This catalyst may be employed in an H-Oil process to which is charged an Arabian Medium/Heavy Vacuum Resid having the following properties:

TABLE V

| Typical Petroleum Feedstock (Arabian Medium/Heavy Vacuum Resid) | |
|---|---|
| API Gravity | 4.8 |
| 1000° F.+, vol % | 87.5 |
| 1000° F.+, wt % | 88.5 |
| Sulfur, wt % | 5.0 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212° F. | 2430 |
| @ 250° F. | 410 |
| @ 300° F. | 117 |
| Pour Point, °F. | 110 |
| n-C$_5$ Insolubles, wt % | 28.4 |
| n-C$_7$ Insolubles, wt % | 9.96 |
| Toluene Insolubles, wt % | 0.02 |
| Asphaltenes, wt % | 9.94 |
| Metals, wppm | |
| Ni | 49 |
| V | 134 |
| Fe | 10 |
| Cu | 3 |
| Na | 49 |
| Chloride, wppm | 28 |

Charge may be admitted in liquid phase at 770° F. and 2250 psig to an ebullated bed of catalyst. Space velocity LHSV is 0.56. Hydrogen is admitted in amount of 7000 SCFB.

Hydrocarbon product may be characterized by increased content of liquid boiling below 1000° F.

EXAMPLES II–VIII

In this series of Examples, the same charge zeolite as that charged to Example I was subjected to steam treating and acid treating conditions. Various properties of the final product were determined as a function of the treating conditions.

Steam Treatment—Treating agent was 100% steam at 1000° F. in these Examples except that the steam temperature was 1400° F. in Example VI*. Treating time was 2 hours in Example II, 0.5 hours in Example VI*, and 5 hours in the remaining Examples.

Acid Treatment Conditions—All runs were carried out for 2 hours at 140° F. except Example II which used 220° F. Examples II, VI and VI used 0.5N aqueous nitric acid. Examples III, V, VII, and VIII used 2.0N aqueous nitric acid. All examples used a weight ratio of 0.04—ratio of solid to liquid during contacting.

TABLE VI

| Example | Zeolite Content % | Unit Cell Size Å | Total Pore Vol cc/g | Surface Si:Al Ratio | Sec. Pore Vol 100–600Å | Sec. Pore Mode Å | Total Surface Area m²/g | Acid Site Density ccNH₃/g |
|---|---|---|---|---|---|---|---|---|
| II | 45 | 24.15 | 0.24 | — | 0.13 | 135 | 717 | — |
| III | 50 | 24.12 | 0.23 | 30 | 0.12 | 125 | 721 | — |
| IV | 59 | 24.18 | 0.23 | — | 0.12 | 125 | 782 | 5.1 |
| V | 64 | 24.17 | 0.24 | 30 | 0.14 | 135 | 720 | 2.4 |
| VI* | 63 | 24.18 (24.25)** (24.27)** | 0.24 | 26 | 0.14 | 125 | 739 | 2.4 |
| VII | 54 | 24.12 | 0.20 | — | 0.11 | 155 | 705 | 2.1 |
| VIII | 43 | 24.05 | 0.22 | 38 | 0.12 | 145 | 688 | 2.0 |

**Numbers in parentheses are obtained from triplicate runs at identical conditions Control Example VI* was run in triplicate. The first time, the lattice constant attained was 24.18 Å; the second time 24.25 Å; the third time 24.27 Å, the latter two being noted in parenthesis. This illustrates that although it may be possible to attain low lattice constant at 1400° F., the results are inconsistent. Consistent reproducible results are only attained by operating below about 1200° F.

From the above table, it is apparent that:

(i) The Unit Cell Size of the product zeolite may be as low as 24.05 Å and may range from 24.05 Å to 24.18 Å. (Down from a charge zeolite at 24.56 Å).

(ii) Zeolite content of the product may range from 43% to 64% the charge zeolite possessing a zeolite content of substantially 100%.

(iii) The Total Pore Volume of the product is about 0.22–0.24 cc/g compared to a charge pore volume of 0.11 cc/g.

(iv) The Pore Volume of the Secondary 100 Å–600 Å pores is about 0.11–0.14 cc/g compared to a charge Secondary Pore Volume of 0.3 cc/g.

(v) The Secondary Pore Mode of the treated product may be 125 Å–155 Å whereas the charge zeolite has no secondary pores.

(vi) The Total Surface Area of the treated product maybe 688–782 square meters per gram as compared to a charge area of 683 m²/g.

These results indicate that Y-zeolites with Unit Cell Sizes less than 24.19 Å can be prepared by subjecting the charge zeolite to steam calcination and acid treatment at conditions specified in the instant invention. The aluminum ion-exchange step, as disclosed in U.S. Pat. Nos. 5,059,567 and 5,242,677, is a critical step in the preparation of stabilized Y-zeolites with Unit Cell Sizes less than 24.19 Å. The instant invention represents an improvement in reducing the processing cost because the aluminum ion-exchange step is eliminated.

EXAMPLE IX*

In this Control Example IX*, the procedure of Example I is duplicated except that the acid employed is 0.1N hydrochloric acid. The product zeolite has a Unit Cell Size of 24.33 Å.

EXAMPLE X*

In this Control Example X*, the procedure of Example I is duplicated except that the acid employed is 0.2N hydrochloric acid. The product zeolite has a Unit Cell Size of about 24.35 Å.

EXAMPLE XI*

In this Control Example XI*, the procedure of Example I is duplicated except that the acid employed is 0.2N nitric acid. The product zeolite has a Unit Cell Size of about 24.36 Å.

EXAMPLE XII*

In this Control Example XIII, the procedure of Example I is duplicated except that the acid employed is 2N hydrochloric acid. The product zeolite has a Unit Cell Size of about 24.13 Å.

EXAMPLE XIII*

In this Control Example XIII*, the procedure of Example I is duplicated except that the acid employed is 0.2N sulfuric acid. The product zeolite has a Unit Cell Size of about 24.35 Å.

The above results show that the concentration of mineral acid employed in the acid treatment step must be greater than 0.2N in order to obtain a product with a Unit Cell Size less than 24.19 Å.

EXAMPLE XIV*

In this Control Example, an attempt was made to duplicate Experiment 5 of Example I of U.S. Pat. No. 3,506,400 to Eberly et al. This Example was selected because it produced a zeolite having the lowest Unit Cell Size (24.28 Å) of those set forth in Table VI of that patent.

In this run, the charge was steamed at 1200° F. for 16 hours (which is outside the scope of the instant invention) and then treated with 0.5N hydrochloric acid at 220° F. for 4 hours.

The product zeolite had a Unit Cell Size of 24.25 Å.

EXAMPLE XV*

In this control Example, the procedure of Example XIV* (the Eberly technique) was duplicated except that the acid treating was effected at 140° F. for 2 hours.

The product zeolite had a Unit Cell Size of 24.25 Å.

EXAMPLES XVI–XXb

In this series of Examples, the procedure of Example I was duplicated except that the concentration of the hydrochloric acid was varied.

TABLE VII

| Example | Normality of Hydrochloric Acid | Unit Cell Size Å |
|---|---|---|
| XVI* | 0.1 | 24.33 |
| XVII* | 0.2 | 24.34 |
| XVIII | 1.0 | 24.19 |
| XIX | 0.5 | 24.15 |
| XX | 2.0 | 24.13 |
| XXa | 0.5 | 24.14 |
| XXb | 0.5 | 24.16 |

The Unit Cell Size reported for Example XIX is 24.15 Å. This run was repeated twice—in Example XXa, the product had a Unit Cell Size of 24.14 Å. In Example XXb, the product had a Unit Cell Size of 24.16 Å.

EXAMPLES XXI–XXIV

In this series of Examples, the procedure of Example I was duplicated except that the conditions were as follows (the acid treatment was with hydrochloric acid).

TABLE VIII

| Example | Stream Treating T° F. | Hours | Acid T° F. | N | Hours | Unit Cell Size Å |
|---|---|---|---|---|---|---|
| XXI | 1000 | 5 | 212 | 0.5 | 4 | 24.02 |
| XXII* | 1000 | 5 | 212 | 0.1 | 4 | 24.35 |
| XXIII* | 1000 | 5 | 212 | 0.1 | 4 | 24.34 |
| XXIV* | 1000 | 16 | 212 | 0.5 | 2 | 24.27 |

EXAMPLES XXV–XXX

In this series of Examples, the charge zeolites were as follows:

TABLE IX

| Example | Charge |
|---|---|
| XXV | Same as Example I |
| XXVI* | The USY charge of Eberly USP 3,506,400 Example 1, Experiment 3 |
| XXVII | Same as Example I |
| XXVIII* | Same as Example I |
| XXIX* | The SUSY super ultrastable PQ CP 304-37 SUSY zeolite |
| XXX* | Same as Example XXIX |
| | All zeolites were steamed at 1000° F. |

Processing conditions, Unit Cell Sizes and relative zeolite contents of product were as follows (In Example XXV, the acid was nitric acid. In Examples XXVI–XXX, the acid was hydrochloric acid).

TABLE X

| Example | Steaming Time Hours | Acid T° F. | N | Hours | Unit Cell Å | Relative Zeolite Content % |
|---|---|---|---|---|---|---|
| XXV | 5 | 140 | 0.5 | 2 | 24.12 | 67 |
| XXVI* | 16 | 220 | 0.1 | 2 | 24.28 | 90 |
| XXVII | 5 | 220 | 0.5 | 4 | 24.02 | 78 |
| XXVIII* | 5 | 220 | 0.1 | 4 | 24.35 | 155 |
| XXIX* | 5 | 220 | 0.5 | 4 | 24.34 | 97 |
| XXX* | 16 | 140 | 0.5 | 2 | 24.27 | 81 |

The relative zeolite contents of the above Examples are on an "as is" basis compared to the charge zeolite (CP 300-56 USY). The product zeolites of experimental Examples XXV and XXVII have Unit Cell Sizes less than 24.19 Å. A comparison of Example XXVII and Control Example XXIX* indicates that the CP 304-37 SUSY zeolite having a framework Silica to Alumina Ratio of about 17 and a bulk silica to alumina mole ratio of about 11.0 (outside of the present invention) does not yield a product zeolite with Unit Cell Size below 24.19 Å. It is also apparent that the product zeolites of the instant invention typically have lower zeolite content than the prior art zeolites. Even though the charge zeolite of Example XXV was steamed for a shorter time than the steaming time of Example XXVI*, the combined steaming/acid treatment of Example XXV causes a greater crystal destruction to the Example XXV charge than to the charge of Example XXVI*. The use of a charge zeolite (as in Example XXVI*) which had been steamed for 16 hours (outside the scope of this invention) does not yield a zeolite product of Unit Cell Size less than 24.19 Å.

EXAMPLES XXXI–XXXVIII

In this series of Examples, the charge zeolites were as follows:

| Example | Charge Zeolite |
|---|---|
| XXXI* | Same as Example 1 |
| XXXII* | " |
| XXXIII* | " |
| XXXIV* | " |
| XXXV* | The commercially available PQ Corporation CP 304-37 super-ultrastable Y-zeolite in NH$_4$+ form |
| XXXVI* | The commercially available PQ Corporation CP 304-37 super-ultrastable Y-zeolite in NH$_4$+ form |
| XXXVII* | The commercially available PQ Corporation CP 300-35 super-ultrastable Y-zeolite in H$^+$ form |
| XXXVIII | The commercially available PQ Corporation CP 300-35 super-ultrastable Y-zeolite in H$^+$ form |

The CP 304-37 SUSY zeolite in NH$_4$+ form (used in Examples XXXV and XXXVI) and the CP 300-35 SUSY zeolites in H+ form (used in Examples XXXVII and XXXVIII), both obtained from PQ Corporation are dealuminated Y-zeolites having bulk silica to alumina mole ratios of 6.5 and 11.0, respectively. The properties of CP 304-37 are comparable to those of the zeolites charged to the process of U.S. Pat. No. 4,840,930 to LaPierre; and the properties of CP 300-35 are comparable to those of the zeolites charged to the process of U.S. Pat. No. 3,449,070 to McDaniel.

Conditions of steaming, Acid Treating, and the resulting Unit Cell Size are as set forth hereinafter:

TABLE XI

| Example | Steaming Treating T° F. | Hours | Nitric Acid T° F. | N | Hours | Unit Cell Å |
|---|---|---|---|---|---|---|
| XXXI* | 1100 | 24 | 140 | 0.5 | 6 | 24.26 |
| XXXII* | 1400 | 24 | 140 | 0.5 | 6 | 24.27 |
| XXXIII* | 1300 | 5 | 140 | 0.5 | 2 | 24.25 |
| XXXIV* | 1400 | 2 | 140 | 0.5 | 2 | 24.28 |

TABLE XI-continued

| Example | Steaming Treating T° F. | Hours | Nitric Acid T° F. | N | Hours | Unit Cell Å |
|---|---|---|---|---|---|---|
| XXXV* | — | — | 140 | 0.5 | 6 | 25.25 |
| XXXVI* | — | — | 140 | 2 | 2 | 24.23 |
| XXXVII* | — | — | 140 | 0.5 | 4 | 24.26 |
| XXXVIII* | — | — | 140 | 0.5 | 2 | 24.33 |

It will be apparent from a comparison of the control examples (marked with an asterisk and falling outside the scope of this invention) and the experimental examples (in the above several tables), that only by use of the process of this invention is it possible to prepare zeolites having a Unit Cell Size of about 24.05 Å–24.18 Å or less—down to as low 24.02 Å.

Operation outside the conditions which define this invention (with respect to steaming temperature and time or acid concentration, temperature, and time) do not permit attainment of the desired results.

Use of the conditions or charge compositions disclosed in U.S. Pat. No. 3,506,400 to Eberly Jr (Example XXVIII*), U.S. Pat. No. 4,840,930 to LaPierre et al (Example XXIX*), or U.S. Pat. No. 3,449,070 to McDaniel et al (Example XXX*) do not permit attainment of the desired results.

It is particularly apparent that it is not possible to attain Unit Cell Size of about 24.19 Å or below if (i) the temperature of steaming is above 1200° F. (qv Example XXXIII*), the time of steaming is at or below 0.5 hours (qv Example VI*) or above 5 hours (qv Example XIV*) or the acid concentration is 0.2N or below (qv Example IX*).

Although this invention has been illustrated by reference to specific embodiments, it will be apparent to those skilled in the art that various changes and modifications may be made which clearly fall within the scope of the invention.

We claim:

1. A method of treating a charge zeolite to produce a zeolite having an ultra low Unit Cell Size, wherein the charge zeolite is characterized by (i) a framework Silica to Alumina Ratio of about 5–10, (ii) a Lattice Constant of 24.45 Å–24.60 Å, (iii) a Secondary Pore Volume less than about 0.05 cc/g, (iv) a Surface Silicon to Aluminum Ratio of about 1–3, and (v) an Acid Site Density of about 5–32 cc $NH_3$/g which consists essentially of contacting said charge zeolite with steam at about 1000° F.–1200° F.;

maintaining said charge zeolite in said contact with steam for about 0.5–8 hours during which time said charge zeolite is converted into a hydrothermally-treated zeolite characterized by (i) a framework Silica to Alumina Ratio of about 10–36, (ii) a decreased Lattice Constant of about 24.28 Å–24.47 Å, (iii) a Secondary Pore Volume of about 0.09–0.13 cc/g, (iv) a Surface Silicon to Aluminum Ratio of about 1–1.5:1, and (v) an Acid Site Density of about 5–16 cc $NH_3$/g;

contacting said hydrothermally-treated zeolite in acid medium of concentration greater than 0.2N at 140° F.–250° F. for 0.5–8 hours thereby converting said hydrothermally-treated zeolite into a hydrothermally-treated acidified zeolite characterized by (i) a framework Silica to Alumina Ratio of about 60–80, (ii) a decreased Lattice Constant of below about 24.19 Å, (iii) an increased Secondary Pore Volume of about 0.11–0.14 cc/g, (iv) a Surface Silicon to Aluminum Ratio of about 24–36, and (v) an Acid Site Density of about 1–6 cc $NH_3$/g and recovering said hydrothermally-treated acidified zeolite characterized by (i) a framework Silica to Alumina Ratio of about 60–80, (ii) a decreased Lattice Constant of below about 24.19 Å, (iii) an increased Secondary Pore Volume about 0.11–0.14 cc/g, (iv) a Surface Silicon to Aluminum Ratio of about 24–36, and (v) an Acid Site Density of about 1–6 cc $NH_3$/g.

2. The method of claim 1 wherein said charge zeolite is an ultra-stable Y-zeolite characterized by a Surface Silicon to Aluminum Ratio of 1–1.5 and an Acid Site Density of 5–16 cc $NH_3$/g.

3. The method of claim 1 wherein said charge zeolite is a dealuminated Y-zeolite characterized by a Surface Silicon to Aluminum Ratio of 1–1.5 and an Acid Site Density of 5–16 cc $NH_3$/g.

4. The method of claim 1 wherein said contacting with steam is carried out at about 1000° F.

5. The method of claim 1 wherein said contacting with steam is carried out for about 5 hours.

6. The method of claim 1 wherein said contacting in an acidic medium is carried out at 140° F.–220° F.

7. The method of claim 1 wherein said contacting in acidic medium is carried out in aqueous nitric acid.

8. A novel dealuminated Y- Zeolite characterized by a Unit Cell Size less than about 24.19 Å which is the product of contacting a charge Y-zeolite characterized by (i) a framework Silica to Alumina Ratio of about 5–10, (ii) a Lattice Constant of 24.45 Å–24.60 Å, (iii) a Secondary Pore Volume less than about 0.05 cc/g (iv) a Surface Silicon to Aluminum Ratio of about 1–3, and (iv) an Acid Site Density of about 7–32 cc $NH_3$/g with steam at about 1000° F.–1200° F.;

maintaining said charge Y-zeolite in said contact with steam for about 0.5–8 hours during which time said charge Y-zeolite is converted into a hydrothermally-treated Y-zeolite characterized by (i) a framework Silica to Alumina Ratio of about 10–36, (ii) a decreased Lattice Constant of about 24.28 Å–24.47 Å, (iii) a Secondary Pore Volume of about 0.09–0.13 cc/g, (iv) a Surface Silicon to Aluminum Ratio of about 1–1.5:1, and (v) an Acid Site Density of about 5–16 cc $NH_3$/g;

contacting said hydrothermally-treated Y-zeolite in acid medium of concentration greater than 0.2N at 140° F.–250° F. for 0.5–8 hours thereby converting said hydrothermally-treated Y-zeolite into a hydrothermally-treated acidified zeolite characterized by (i) a framework Silica to Alumina Ratio of about 60–80, (ii) a decreased Lattice Constant of below about 24.19 Å, (iii) an increased Secondary Pore Volume of about 0.11–0.14 cc/g, (iv) a Surface Silicon to Aluminum Ratio of about 24–36, and (v) an Acid Site Density of about 1–6 cc $NH_3$/g.

recovering said hydrothermally-treated acidified zeolite characterized by (i) a framework Silica to Alumina Ratio of about 60–80, (ii) a decreased Lattice Constant of below about 24.19 Å, (iii) an increased Secondary Pore Volume of about 0.11–0.14 cc/g, (iv) a Surface Silicon to Aluminum Ratio of about 24–36, and (v) an Acid Site Density of about 1–6 cc $NH_3$/ g.

9. The novel dealuminated Y-zeolite of claim 8 characterized by (i) a decreased Unit Cell Size of less than about 24.19 Å, (ii) a Secondary Pore Diameter of 100 Å–600 Å, (iii) an increased Secondary Pore Volume of 0.11–0.14 cc/g, (iv) a Secondary Pore Mode of 105 Å–190 Å, (v) a Surface Silicon to Aluminum Ratio of 26–36 and (vi) an Acid Site Density of about 1–6 cc $NH_3$/g.

10. The zeolite of claim 9 wherein the Unit Cell Size is 24.02–24.09 Å.

11. A method of hydrotreating a hydrocarbon charge containing a substantial portion of hydrocarbons boiling above 1000° F. which comprises contacting said hydrocarbon charge containing a substantial portion of hydrocarbons boiling above 1000° F. with, as all or portion of a catalyst, a zeolite having a Unit Cell Size of less than 24.14 Å, a framework silica to alumina ratio of about 60–80, a secondary pore volume of about 0.11–0.14 cc/g, a surface silicon to aluminum ratio of about 24–36, and an acid site density of about 1–6 NH$_3$/g;

maintaining said hydrocarbon charge in contact with said zeolite having a Unit Cell Size of less than about 24.14 Å at hydrotreating conditions including temperature of about 650° F.–950° F., pressure of about 1000–4000 psig, and hydrogen feed of about 1000–50,000 SCFB thereby forming hydrotreated product; and recovering said hydrotreated product.

12. A method of cracking a hydrocarbon charge which comprises contacting said hydrocarbon charge with, as all or portion of a catalyst, a zeolite having a Unit Cell Size of 24.02 Å to 24.14 Å, a framework silica to alumina ratio of about 60–80, a secondary pore volume of about 0.11–0.14 cc/g, a surface silicon to aluminum ratio of about 24–36, and an acid site density of about 1–6 NH$_3$/g;

maintaining said hydrocarbon charge in contact with said zeolite having a Unit Cell Size of 24.02 Å to 24.14 Å at cracking conditions including temperature of about 900° F.–1100° F. and pressure of about 0–20 psig.

13. A method of cracking a hydrocarbon charge claimed in claim 12 wherein said hydrocarbon charge is a gas oil.

14. A method of hydrotreating a hydrocarbon charge containing hydrocarbons boiling above 1000° F. which comprises contacting said hydrocarbon charge containing hydrocarbons boiling above 1000° F. with as all or portion of a catalyst a hydrothermally-treated acidified zeolite produced by the method of claim 1, maintaining said hydrocarbon charge in contact with said hydrothermally-treated acidified zeolite at hydrotreating conditions, thereby forming a hydrotreated product and recovering said hydrotreated product.

15. A method of cracking a hydrocarbon charge which comprises contacting said hydrocarbon charge with, as all or portion of a catalyst, a hydrothermally-treated acidified zeolite produced by the method of claim 1, maintaining said hydrocarbon charge in contact with said hydrothermally-treated acidified zeolite at cracking conditions and recovering said cracked product.

\* \* \* \* \*

UNITED STATES PATENT AND TRADEMARK OFFICE
CERTIFICATE OF CORRECTION

PATENT NO. : 5,534,135
DATED : July 9, 1996
INVENTOR(S) : Pei-Shing E. Dai et al It is certified that error appears in the above-indentified patent and that said Letters Patent is hereby corrected as shown below:

Column 18, line 47, "zeolite" should be --Y-zeolite--.

Column 19, line 1, "9" should be --8--.

Signed and Sealed this

Third Day of December, 1996

Attest:

BRUCE LEHMAN

*Attesting Officer*     *Commissioner of Patents and Trademarks*